(12) United States Patent
Dong et al.

(10) Patent No.: US 9,985,867 B2
(45) Date of Patent: May 29, 2018

(54) OPTIMIZING EVPN FOR DATA CENTERS WITH REDUNDANT TOP-OF-RACK DEPLOYMENTS

(71) Applicant: Cisco Technology, Inc., San Jose, CA (US)

(72) Inventors: Liqin Dong, San Jose, CA (US);
Shyam Kapadia, San Jose, CA (US);
Neeraj Malhotra, Los Gatos, CA (US);
Richard Lam, Cupertino, CA (US);
Lukas Krattiger, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 15/043,079

(22) Filed: Feb. 12, 2016

(65) Prior Publication Data

US 2017/0171057 A1 Jun. 15, 2017

Related U.S. Application Data

(60) Provisional application No. 62/266,124, filed on Dec. 11, 2015.

(51) Int. Cl.
*H04L 12/751* (2013.01)
(52) U.S. Cl.
CPC .................... *H04L 45/02* (2013.01)
(58) Field of Classification Search
None
See application file for complete search history.

(56) References Cited

U.S. PATENT DOCUMENTS

| | | | |
|---|---|---|---|
| 6,970,464 B2 | 11/2005 | Xu et al. | |
| 8,953,590 B1 | 2/2015 | Aggarwal et al. | |
| 9,225,597 B2 | 12/2015 | Tubaltsev et al. | |
| 9,258,266 B2 | 2/2016 | Natarash et al. | |

(Continued)

OTHER PUBLICATIONS

Johnson, Craig, "Overlay Networks in the Datacenter," retrieved from http://dfw.cisco-users.org/zips/20150204_DFWCUG_Overlay_Networks_In_The_Datacenter_pdf, Feb. 4, 2015, 97 pages.

(Continued)

*Primary Examiner* — Jeffrey M Rutkowski
*Assistant Examiner* — Andre Tacdiran
(74) *Attorney, Agent, or Firm* — Edell, Shapiro & Finnan, LLC

(57) ABSTRACT

Presented herein are methods for advertising an IP prefix to address the connectivity problem in multi-chassis link aggregation scenario. A peer switch will advertise two VTEP addresses. It will use a physical IP (PIP) address as a next hop (NH) for a prefix route, while continuing to use a VIP for host IP and MAC route advertisement. A new virtual MAC is introduced and it is derived from the VIP as the router MAC associated with VIP. A switch is made to use a VIP for prefix advertisement when a device detects that the same prefix is reachable both locally and from its peer. This saves adjacency entries consumed in the remote VTEPs. These techniques fix the connectivity issue for prefix routes that is exposed with current EVPN, without requiring any additional adjacency resource consumption.

20 Claims, 7 Drawing Sheets

(56) References Cited

U.S. PATENT DOCUMENTS

| | | | | |
|---|---|---|---|---|
| 2004/0013120 | A1* | 1/2004 | Shen | H04L 12/4679 370/395.31 |
| 2005/0207421 | A1* | 9/2005 | Suzuki | H04L 29/12254 370/392 |
| 2007/0104106 | A1* | 5/2007 | Patel | H04L 45/02 370/238 |
| 2009/0257440 | A1* | 10/2009 | Yan | H04L 45/02 370/401 |
| 2010/0220736 | A1* | 9/2010 | Mohapatra | H04L 45/04 370/401 |
| 2013/0173823 | A1* | 7/2013 | Mann | G06F 11/00 709/240 |
| 2014/0101302 | A1* | 4/2014 | Yang | H04L 41/0813 709/224 |
| 2014/0204760 | A1* | 7/2014 | Durrani | H04L 47/41 370/236 |
| 2014/0211801 | A1* | 7/2014 | Trainin | H04W 8/26 370/392 |
| 2015/0074168 | A1* | 3/2015 | Hartman | G06F 17/30091 709/201 |
| 2015/0124586 | A1* | 5/2015 | Pani | H04L 12/18 370/219 |
| 2015/0295849 | A1 | 10/2015 | Xia et al. | |
| 2015/0341220 | A1 | 11/2015 | Sikand et al. | |
| 2017/0230198 | A1* | 8/2017 | Xu | H04L 12/4633 |

OTHER PUBLICATIONS

Sajassi, et al., "BGP MPLS-Based Ethernet VPN," Internet Engineering Task Force (IETF), Request for Comments: 7432, Standards Track, Feb. 2015, 56 pages.

Rabadan, et al., "IP Prefix Advertisement in EVPN," draft-rabadan-l2vpn-evpn-prefix-advertizement-03, Internet Engineering Task Force (IETF), Internet-Draft, L2VPN Workgroup, Standards Track, Oct. 16, 214, 20 pages.

Sajassi, et al., "Integrated Routing and Bridging in EVPN," draft-ieff-bess-evpn-inter-subnet-forwarding-01, Internet Engineering Task Force (IETF), Internet-Draft, L2VPN Workgroup, Standards Track, Oct. 18, 2015, 26 pages.

Cisco, "VXLAN Design with Cisco Nexus 9300 Platform Switches," Guide, Oct. 2014, 39 pages.

* cited by examiner

OPTIMIZING EVPN FOR DATA CENTERS WITH REDUNDANT TOP-OF-RACK DEPLOYMENTS

CROSS REFERENCE TO RELATED APPLICATION

This application claims priority to U.S. Provisional Patent Application No. 62/266,124, filed Dec. 11, 2015, the entirety of which is incorporated herein by reference.

TECHNICAL FIELD

The present disclosure relates to redundant top-of-rack switch deployments.

BACKGROUND

Virtual eXtensible Local Area Network (VXLAN) is an overlay technology for network virtualization. It provides Layer-2 extension over a Layer-3 underlay infrastructure network by using Media Access Control (MAC) in Internet Protocol/User Datagram Protocol (IP/UDP) tunneling encapsulation. VXLAN tunnel end point (VTEP) is a software or hardware component that performs VXLAN encapsulation and decapsulation. The IP address used by a VTEP as the source address for VXLAN encapsulation is called VTEP address. Multiprotocol Border Gateway Protocol Ethernet Virtual Private Network (MP-BGP EVPN) provides protocol-based VTEP peer discovery and end-host reachability information distribution that allows more scalable VXLAN overlay network designs suitable for private and public clouds.

In EVPN, MAC/IP routes are advertised in Route Type-2 (RT-2) EVPN Network Layer Reachability Information (NLRI), and IP prefix routes are advertised in RT-5 EVPN NLRI. In the BGP update message, the Next Hop (NH) field is the VTEP address. The Router's MAC Extended Community carries the router MAC of the VTEP. The receiving VTEP uses this MAC as the inner destination MAC (DMAC) for routed packets and BGP NH address as VXLAN tunnel destination address.

Virtual Port Channels (vPC) is a type of multi-chassis link aggregation (for EtherChannel) solution that presents two paired devices as a unique Layer 2 logical node to devices connected to them. vPC offers the redundancy protection through dual active/active default gateways for servers.

One software architecture for L2 and L3 VxLAN overlay networks employs an EVPN control plane. A virtual IP address (VIP) shared by both vPC peers is used as the VTEP address for advertising hosts and prefixes learned by the vPC peers. The device router MAC is carried in the Router's MAC extended community. Traffic sent to the virtual IP address will be forwarded to one of the vPC peers based on underlay routing. In a non vPC case, the primary IP (PIP) address of the box is used as the VTEP address. The use of virtual IP as a VTEP address allows the remote end point to view the vPC peers as a logical entity and is essential to MAC address installation, when most vendors do not support MAC level equal-cost multi-path (ECMP). This introduces problems in packet forwarding to prefixes that are known only to one of the vPC peers.

DESCRIPTION OF EXAMPLE EMBODIMENTS

Overview

Figure 1:
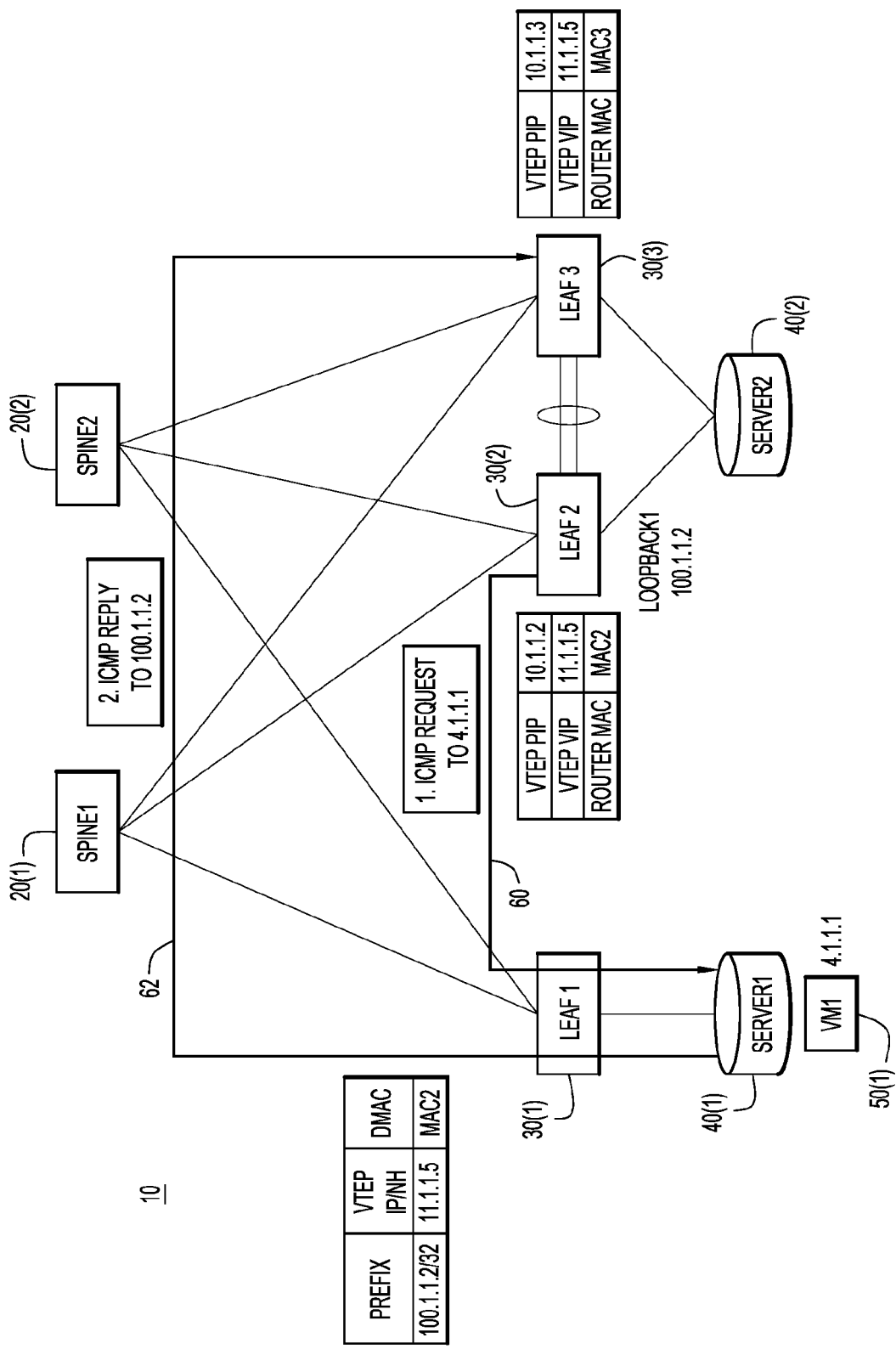
FIG. 1 is a diagram illustrating a network architecture with redundant top-of-rack switches.

Presented herein are methods for advertising an IP prefix to address the connectivity problem in multi-chassis link aggregation scenario. A first switch and a second switch are configured as multi-chassis link aggregation peers to each other in a data center network. Each of the first and second switches is configured to function as a virtual tunneling endpoint with respect to an overlay virtual network. Each of the first switch and second switch is configured to perform similar operations, including: sending a gateway protocol advertisement message to a particular switch in the data center network that is configured to distribute advertisement messages to all switches in the data center network, the gateway protocol advertisement message including a physical Internet Protocol address as a next hop for a prefix route of the first switch (a physical Internet Protocol address as a next hop for a prefix route of the second switch) and a virtual Internet Protocol address for a host Internet Protocol address and media access control route advertisement, which virtual Internet Protocol address is shared by the first switch and the second switch; receiving from the particular switch a gateway protocol update message; determining from the gateway protocol update message that the second switch (first switch) has the prefix route and indicating the prefix route is also locally reachable from the second switch (first switch); in response to determining that the second switch (first switch) has the prefix route, changing the physical Internet Protocol address to the virtual Internet Protocol address for purposes of advertising a next hop address for the prefix route; and sending to the particular switch a gateway protocol update message containing the virtual Internet Protocol address as the next hop address for the prefix route.

Thus, a peer switch will advertise two VTEP addresses. It will use a physical IP (PIP) address as a next hop (NH) for a prefix route, while continuing to use a VIP for host IP and MAC route advertisement. A new virtual MAC is introduced and it is derived from the VIP as the router MAC associated with VIP. A switch is made to use a VIP for prefix advertisement when a device detects that the same prefix is reachable both locally and from its peer. This saves adjacency entries consumed in the remote VTEPs. These techniques fix the connectivity issue for prefix routes that is exposed with current EVPN, without requiring any additional adjacency resource consumption.

DETAILED DESCRIPTION

Virtual eXtensible Local Area Network (VXLAN) is an overlay technology for network virtualization. It provides Layer-2 extension over a Layer-3 underlay infrastructure network by using Media Access Control (MAC) in Internet Protocol/User Datagram Protocol (IP/UDP) tunneling encapsulation. VXLAN tunnel end point (VTEP) is a software or hardware component that performs VXLAN encapsulation and decapsulation. The IP address used by a VTEP as the source address for VXLAN encapsulation is called VTEP address. Multiprotocol Border Gateway Protocol Ethernet Virtual Private Network (NIP-BGP EVPN) provides protocol-based VTEP peer discovery and end-host reachability information distribution that allows more scalable VXLAN overlay network designs suitable for private and public clouds.

In EVPN, MAC/IP routes are advertised in Route Type-2 (RT-2) EVPN Network Layer Reachability Information (NLRI), and IP prefix routes are advertised in RT-5 EVPN NLRI. In the BGP update message, the Next Hop (NH) field is the VTEP address. The Router's MAC Extended Community carries the router MAC of the VTEP. The receiving VTEP uses this MAC as the inner destination MAC (DMAC) for routed packets and BGP NH address as VXLAN tunnel destination address.

Virtual Port Channels (vPC) is a type of multi-chassis link aggregation (for EtherChannel) solution that presents two paired devices as a unique Layer 2 logical node to devices connected to them. vPC offers the redundancy protection through dual active/active default gateways for servers.

One software architecture for L2 and L3 VxLAN overlay networks employs an EVPN control plane. A virtual IP address (VIP) shared by both vPC peers is used as the VTEP address for advertising hosts and prefixes learned by the vPC peers. The device router MAC is carried in the Router's MAC extended community. Traffic sent to the virtual IP address will be forwarded to one of the vPC peers based on underlay routing. In a non vPC case, the primary IP (PIP) address of the box is used as the VTEP address. The use of virtual IP as VTEP address allows the remote end point to view the vPC peers as a logical entity and is essential to MAC address installation, when most vendors do not support MAC level equal-cost multi-path (ECMP). This introduces problems in packet forwarding to prefixes that are known only to one of the vPC peers.

FIG. 1 shows a simplified diagram of a data center network 10. The network includes spine switches 20(1) and 20(2) and leaf switches 30(1), 30(2) and 30(3). The spine switches 20(1) and 20(2) are denoted spine1 and spine 2, respectively, and the leaf switches 30(1)-30(3) are denoted leaf1, leaf2 and leaf3, respectively.

In the scenario shown in FIG. 1, leaf1, leaf2 and leaf3 are VTEPs. Leaf2 and leaf3 form vPC peering and share a VIP address of 11.1.1.5 as a VTEP address. 10.1.1.2 and 10.1.1.3 are the PIP addresses for leaf2 and leaf3 respectively. Server1 shown at reference numeral 40(1) is connected to leaf1 and server2 denoted at reference numeral 40(2) is connected to vPC peers leaf2 and leaf3. There is a virtual machine VM1 denoted by reference numeral 50(1) running on server1. Leaf2 has a loopback interface (Loopback1) with IP address of 100.1.1.2 in the overlay. This address is advertised to remote VTEPs in a BGP message with VIP 11.1.1.5 as the next hop (NH).

At reference numeral 60, a user issues an Internet Control Message Protocol (ICMP) request ping (ICMP request to 4.1.1.1) from leaf2's address 100.1.1.2 to VM1 connected to leaf1, the Internet Control Message Protocol (ICMP) reply from VM1 as shown at reference numeral 62 will be VXLAN encapsulated at leaf1 using VIP address 11.1.1.5 as the destination IP address in the outer header. This packet could land at leaf3 because the address 11.1.1.5 has been advertised by both leaf2 and leaf3 in underlay routing. The ping fails when the ICMP reply arrives at leaf3 instead of at leaf2, as shown in FIG. 1.

The above problem of using VIP as a VTEP address not only breaks the ping and other IP traffic from a vPC peer to a remote host, but this has a similar effect for any case in which the prefix is not known to both vPC peers, which includes border leafs with asymmetric connectivity to external networks, and vPC VTEPs performing Dynamic Host Configuration Protocol (DHCP) relay functions. This problem is solved according to the techniques described below.

Figure 2:
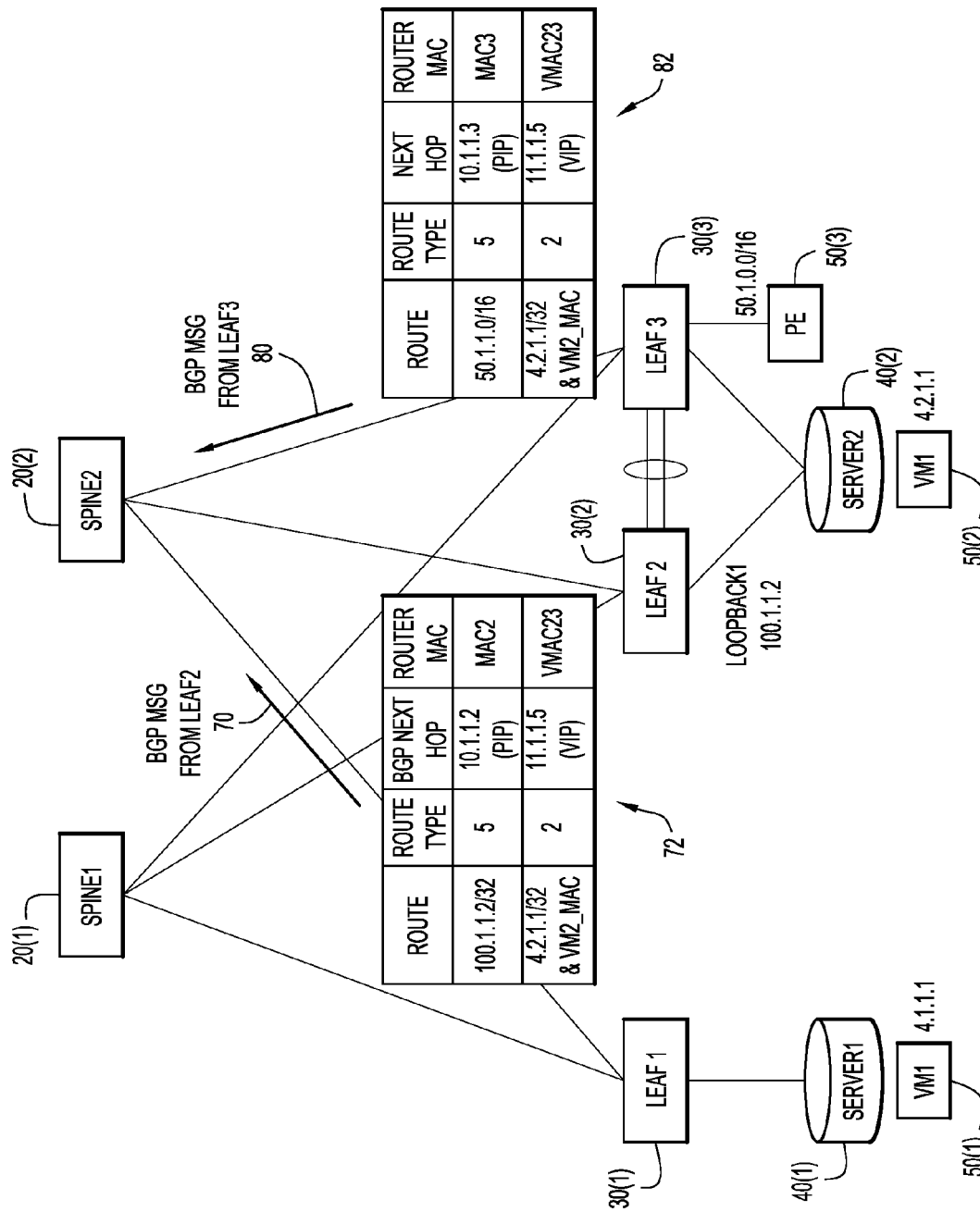
FIG. 2 is a diagram, similar to FIG. 1, and illustrating advertisement messages sent by the redundant switches, according to an example embodiment.

Reference is now made to FIG. 2. FIG. 2 shows the same network architecture as FIG. 1, but with the vPC VTEP peers leaf2 and leaf3 implementing a solution as now described. First, a vPC VTEP will advertise two VTEP addresses. It will use a PIP address for a prefix route via EVPN Route-type 5 (RT-5) NLRI, while continuing to use a VIP address for a host IP address and MAC address via EVPN Route-type 2 (RT-2) NLRI. This means that a remote VTEP will see two VTEP addresses associated with this VTEP, one is a VIP for any locally attached host, and the other is PIP for prefix routes.

As shown in FIG. 2, leaf2 has a loopback for the address 100.1.1.2 and has connected to it VM2 shown at reference numeral 50(2) at address 4.2.1.1, and Leaf3 has connected to it a provider edge (PE) device 50(3) at 50.1.0.0/16. When leaf2 sends a BGP message advertising the hosts connected to it, it will use its PIP for the prefix route for the loopback 100.1.1.12 because it is a RT-5 route, since it is connected only to leaf2. Thus, the BGP message 70 from leaf2 includes content shown at reference numeral 72 indicating that the BGP Next Hop for 100.1.1.2 is the VTEP PIP of leaf2, which as shown in FIG. 1, is 10.1.1.2. On the other hand, VM2 is a RT-2 route because it is a locally attached host. Therefore, leaf2 advertises in the BGP message 70 that the BGH Next Hop for the route to VM2, it will use the VIP of leaf2, which is 11.1.1.5.

Leaf3 performs similar operations. The BGP message 82 from Leaf3 includes content shown at 82. For VM2 (which is a RT-2 route), Leaf3 will include in its BGP message 80 that the Next Hop is the VIP address 11.1.1.5, and for the PE 50(3) at address 50.1.0.0/16 (which is a RT-5 route), it will include in the BGP message 80 leaf3's PIP address or 10.1.1.3 for the Next Hop.

Next is to consider which MAC address should be carried in a Router's MAC Extended Community together with each of the VTEP address. Since most Application Specific Integrate Circuits (ASICs) perform post-layer 3 layer 2 lookup and rely on the inner destination MAC (DMAC) address to decide which VTEP address to use as the destination IP address for VXLAN encapsulation, one MAC address serving multiple VTEP addresses would not work.

To address this problem, the construct of a virtual MAC (VMAC) is created. The VMAC is derived from the VIP address as the router MAC address associated with VIP address. When a VTEP advertises routes using a VIP address as the next hop, this virtual MAC is carried in the Router's MAC extended community. When a VTEP advertises routes using a PIP address, the device router MAC address is used. This virtual MAC address will have the last 4 bytes set to the value of the VIP address, and the Universal/Local bit (the second least-significant bit of the most significant byte of the virtual MAC address) set to 1 to indicate that this MAC address is locally administered. The VMAC address will result in a router MAC address match for layer 3 lookup, when the incoming packet is a VXLAN packet carrying the L3 VXLAN Network Identifier (VNI) (associated with the tenant virtual router forwarder used for symmetric Integrated Routing and Bridging (IRB) routing). This eliminates any concern that this MAC address could conflict with a tenant MAC address, as a tenant MAC address is accompanied with a layer 2 VNI if the packet is VXLAN encapsulated.

This virtual MAC is derived from the VIP address, which is shared by both vPC peers, e.g., leaf2 and leaf3 shown in the example of FIG. 2. Therefore the VMAC is also shared by both vPC peers. This eliminates the need for the vPC peers to synchronize each other's device MAC address, which was previously required because the VIP address was associated with the device's MAC address. In the example of FIG. 2, the VMAC used by leaf2 and leaf3 is denoted VMAC23 and is used for a RT-2 route when the VIP address is advertised as the Next Hop.

When a prefix route is reachable from both vPC peers, using the PIP address as the Next Hop on the prefix route advertisement means that the remote VTEPs would see two route advertisements, one from each of the vPC peers, each with a different next hop. This would result in equal cost multipath (ECMP) for the prefix route, which would usually mean installing a block of two adjacency entries, one for each path. The adjacency entry contains the DMAC address, which is used for a layer 2 rewrite and to derive the VTEP address to encapsulate. The adjacency entry also includes the information to derive the layer 3 VNI to be put into the VXLAN header to identify which virtual router forwarder (VRF) to which the packet belongs. Consequently, adjacency entries usually cannot be shared across VRFs. This means that in a scenario in which there are many VRFs and many vPC leafs in the EVPN fabric, the number of adjacencies that would be consumed could be significant in the presence of ECMP. In order to save the consumption of adjacency entry usage, the following technique may be employed.

When a vPC device detects that the prefix is reachable both locally and from its vPC peer, it will advertise the prefix using the VIP address as the Next Hop. This applies to the two cases below:
  A. When the vPC device needs to advertise a local IP subnet which also exists on its peer.
  B. When the vPC device receives a BGP update from its peer about the same prefix, it will change to use the VIP address as the next hop. Similarly, when vPC receives a BGP withdraw message indicating that the peer no longer has reachability to the prefix, it will change the next hop from the VIP address to its PIP address.

Using these techniques, other than a transient state, there would never be a case in which a prefix route advertised by a vPC pair has an ECMP with two different next hops.

Figure 3:
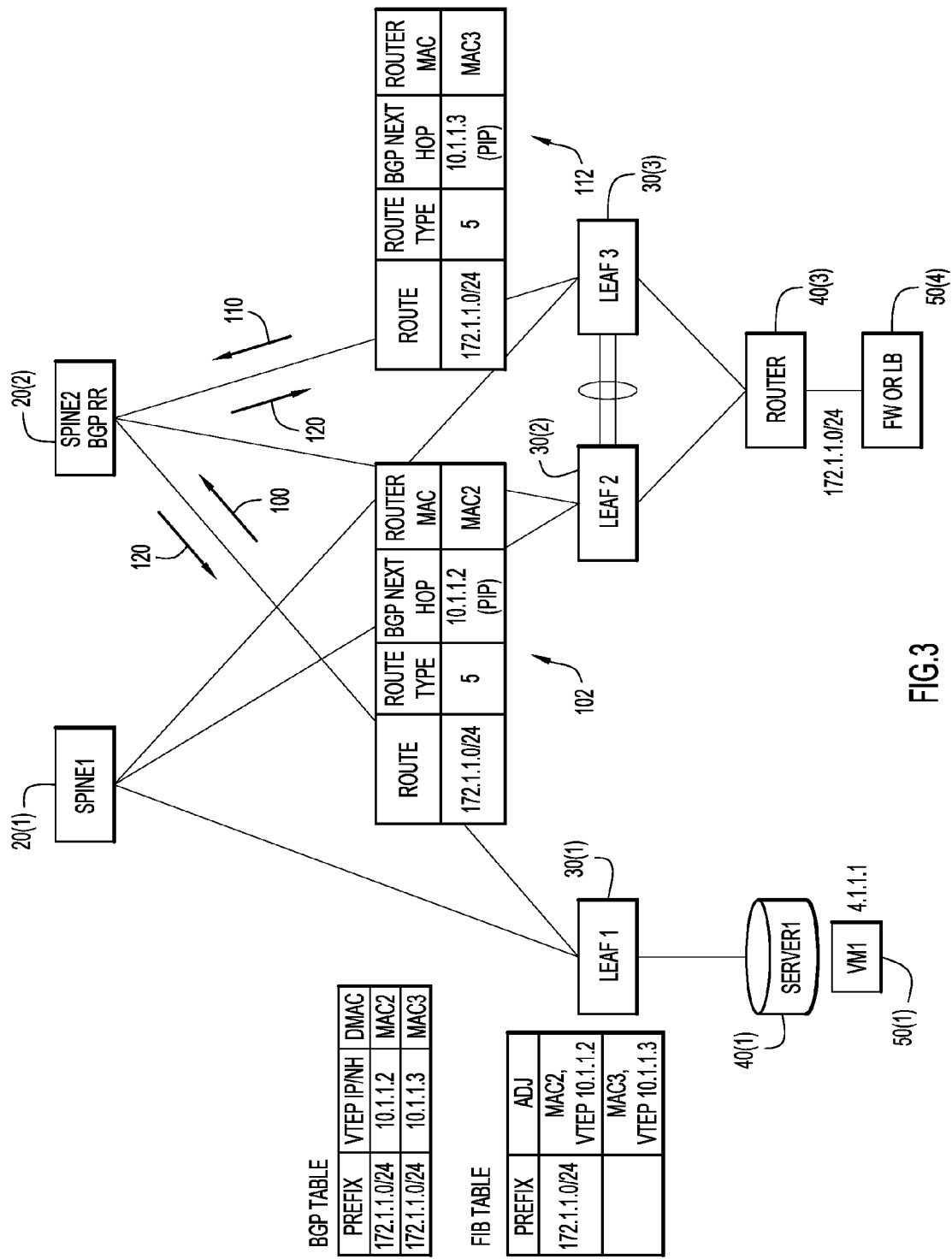
FIGS. 3-5 are diagrams illustrating steps of a method for generating advertisement messages by the redundant switches, according to an example embodiment.
Figure 4:
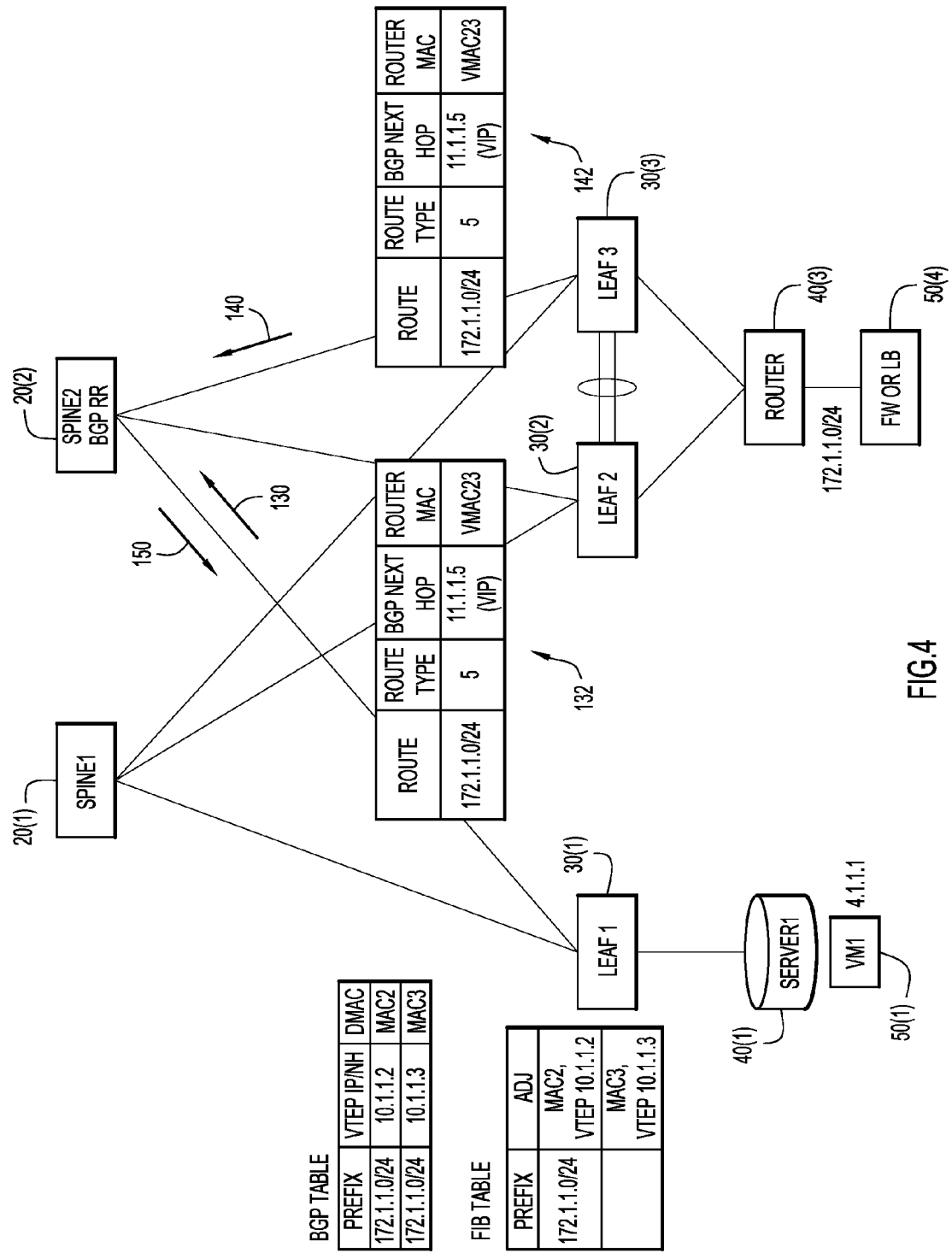
Figure 5:
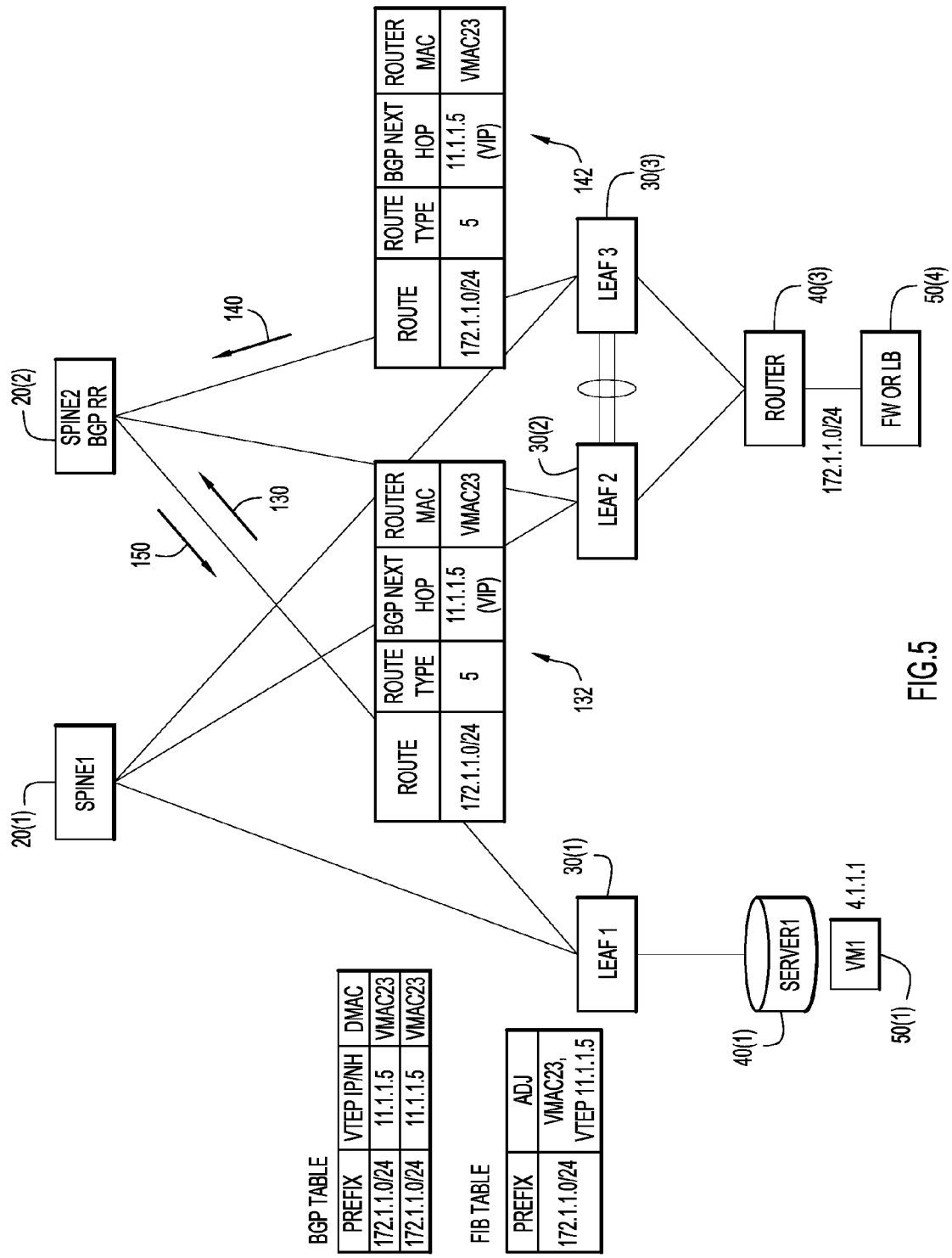

Reference is now made to FIGS. 3-5 for a description of how the leaf switches that are in a multi-chassis link aggregation configuration (e.g., vPC) generate BGP messages to advertise RT-2 and RT-5 routes using the techniques presented herein. In the example of FIGS. 3-5, there is a router connected to leaf2 and leaf3 and connected to the router 40(3) is a firewall (FW) or loadbalancer (LB) shown at reference numeral 50(4).

As shown at 100 and 110 in FIG. 3, leaf2 and leaf3 advertise 172.1.1.0/24 using their respective PIP addresses (10.1.1.2 for leaf2 and 10.1.1.3 for leaf3), to spine2, which also serves as a BGP Route Reflector (RR). The content of the BGP message sent by leaf2 is shown at 102 and the content of the BGP message sent by leaf3 is shown at 112. Next, at 120, the BGP RR (spine2) sends the update to all leafs, including leaf1. Leaf1 programs the 172.1.1.0/24 using 2 adjacencies as shown in the FIB table at leaf1. Leaf2 and leaf3 also will receive the BGP update 120 from the BGP RR and learn that 172.1.1.0 is also advertised by its vPC peer.

Next, in FIG. 4, from the BGP update received from the BGP RR (spine2), leaf2 and leaf3 determine that 172.1.1.0/24 is also advertised by its vPC peer. As a result, leaf2 and leaf3 change the next hop address to use for 172.1.1.0/24 to the VIP address (11.1.1.5) associated with the vPC complex of leaf2 and leaf3. In addition, leaf2 and leaf3 change the router MAC address (MAC2 and MAC3, respectively) to the VMAC address denoted as VMAC23, using the techniques described above. At 130 leaf2 sends a BGP update message to the BGP RR (spine2) and at 140 leaf3 sends a BGP update message to the BGP RR. The content of BGP update message from leaf2 is shown at reference numeral 132 and the content of BGP update message from leaf3 is shown at reference numeral 142. At 150, the BGP RR sends an update to all the leafs, and leaf1 is thereby notified of the new address to use for 172.1.1.0/24.

As shown in FIG. 5, leaf1 now uses only one adjacency for 172.1.1.0/24, as shown by the updated FIB table at leaf1, and the adjacency for 172.1.1.0/24 is the VTEP or VIP address 11.1.1.5. In addition, MAC2 and MAC3 of leaf2 and leaf3 are replaced with VMAC23.

While not specifically shown in FIGS. 3-5, 100.1.1.2, the address of loopback interface at leaf2, is advertised with the Next Hop being leaf2's PIP address and local router MAC address of leaf2. Similarly, 50.1.0.0/16 is the external subnet which is only learned by leaf3. Leaf3 advertises it with its PIP address and its local router MAC address, MAC3. For 172.1.1.0/24, the address for the firewall or loadbalancer 50(4), 172.1.1.0/24 will be advertised in EVPN Route-type 5 update, with the VIP address as the Next Hop and the VMAC as VMAC23.

To summarize, a vPC VTEP will advertise two VTEP addresses. It will use a PIP address as NH for a prefix route, while continue to use a VIP address for host IP and MAC route advertisement. A new virtual MAC is introduced and it is derived from the VIP as the router MAC associated with VIP. Finally, a change is made to use a VIP for prefix advertisement when a vPC device detects that the same prefix is reachable both locally and from its vPC peer. This saves adjacency entries consumed in the remote VTEPs. These techniques fix the connectivity issue for prefix routes that is exposed with current EVPN, without requiring any additional adjacency resource consumption.

The forgoing has been described in the context of vPC. This is not meant to be limiting. Other embodiments of Multi-Chassis Link Aggregation Group (MC-LAG) may employ these same techniques. Also, although VXLAN is described herein as a fabric encapsulation, this is only an example. These techniques are applicable to any overlay technology, such as Network Virtualization using Generic Routing Encapsulation (NVGRE), Stateless Transport Tunneling (STT), Generic Network Virtualization Encapsulation (GENEVE) etc.

Figure 6:
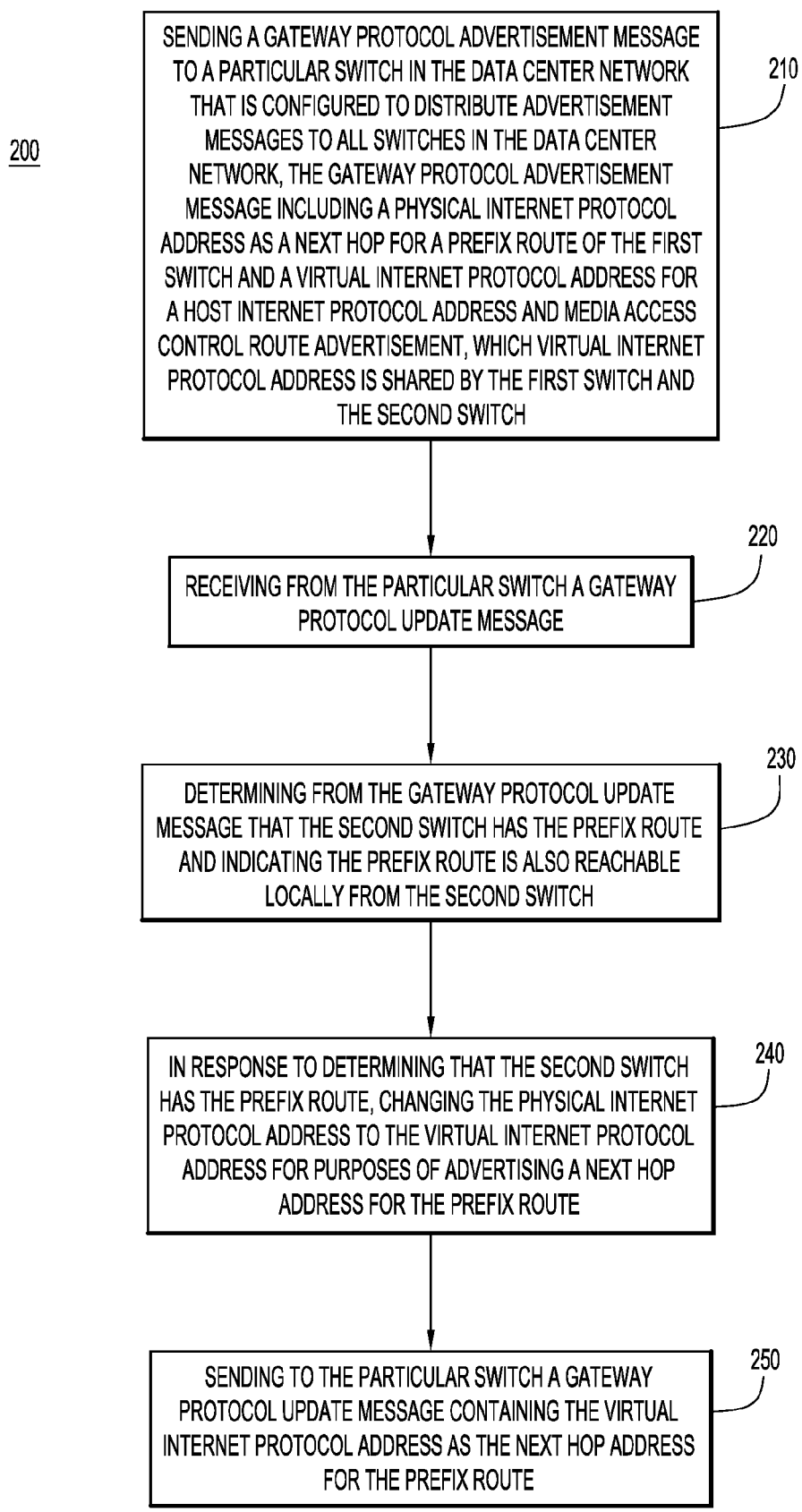
FIG. 6 is a flow chart illustrating a method performed at each of the redundant switches, according to an example embodiment.

In summary, presented herein are methods of advertising an IP prefix in EVPN to address the connectivity problem in multi-chassis link aggregation (e.g., vPC) scenario. An example flow chart for a generalized method 200 according to the example embodiments presented herein, is shown in FIG. 6. In this generalized method, there is a data center network that includes a first switch and a second switch. The first switch is configured to function as a virtual tunneling endpoint with respect to an overlay virtual network and being a multi-chassis link aggregation peer to the second switch in the data center network, the second switch also being configured to function as a virtual tunneling endpoint with respect to the overlay virtual network. This method is described from the perspective of the first switch, though it should be understood that it is representative of a similar method performed at the second switch that is a multi-chassis link aggregation peer to the first switch.

At 210, the first switch sends a gateway protocol advertisement message to a particular switch in the data center network that is configured to distribute advertisement messages to all switches in the data center network. The gateway protocol advertisement message includes a physical Internet Protocol address as a next hop for a prefix route of the first switch and a virtual Internet Protocol address for a host Internet Protocol address and media access control route advertisement. The virtual Internet Protocol address is shared by the first switch and the second switch. The particular switch may be any switch, such as, but not limited to, a spine switch or a leaf switch in the data center network, wherein the particular switch is configured to serve as a BGP RR.

At 220, the first switch receives from the particular switch a gateway protocol update message.

At 230, the first switch determines from the gateway protocol update message that the second switch has the (same) prefix route, thus indicating the prefix route is also reachable locally from the second switch.

At 240, in response to determining that the second switch has the prefix route, the first switch changes the physical Internet Protocol address to the virtual Internet Protocol address for purposes of advertising a next hop address for the prefix route.

At 250, the first switch sends to the particular switch a gateway protocol update message containing the virtual Internet Protocol address as the next hop address for the prefix route.

While FIG. 6 is described in connection with operations performed at the first switch, it should be understood that the same operations are performed at the second switch based on information the second switch learns from gateway protocol update messages sent by the first switch.

As explained above, the first switch may generate a virtual media access control address to be used as a media access control address for the first switch and the second switch and associated with the virtual Internet Protocol address, wherein the gateway protocol update message sent to the particular switch by the first switch includes the virtual media access control address when the virtual Internet Protocol address is used as the next hop address. The virtual media access control address comprises a predetermined number of bytes set to a value of the virtual Internet Protocol address and a predetermined bit set to indicate that the virtual media access control address is locally administered. The predetermined number of bytes may be the last 4 bytes of the virtual media access control address and the predetermined bit may be the second least-significant bit of the most significant byte of the virtual media access control address.

When the first switch receives a gateway protocol withdraw message indicating that the second switch no longer has reachability to the prefix route, the first switches changes the next hop address for the prefix route from the virtual Internet Protocol address to the physical Internet Protocol address of the first switch.

Figure 7:
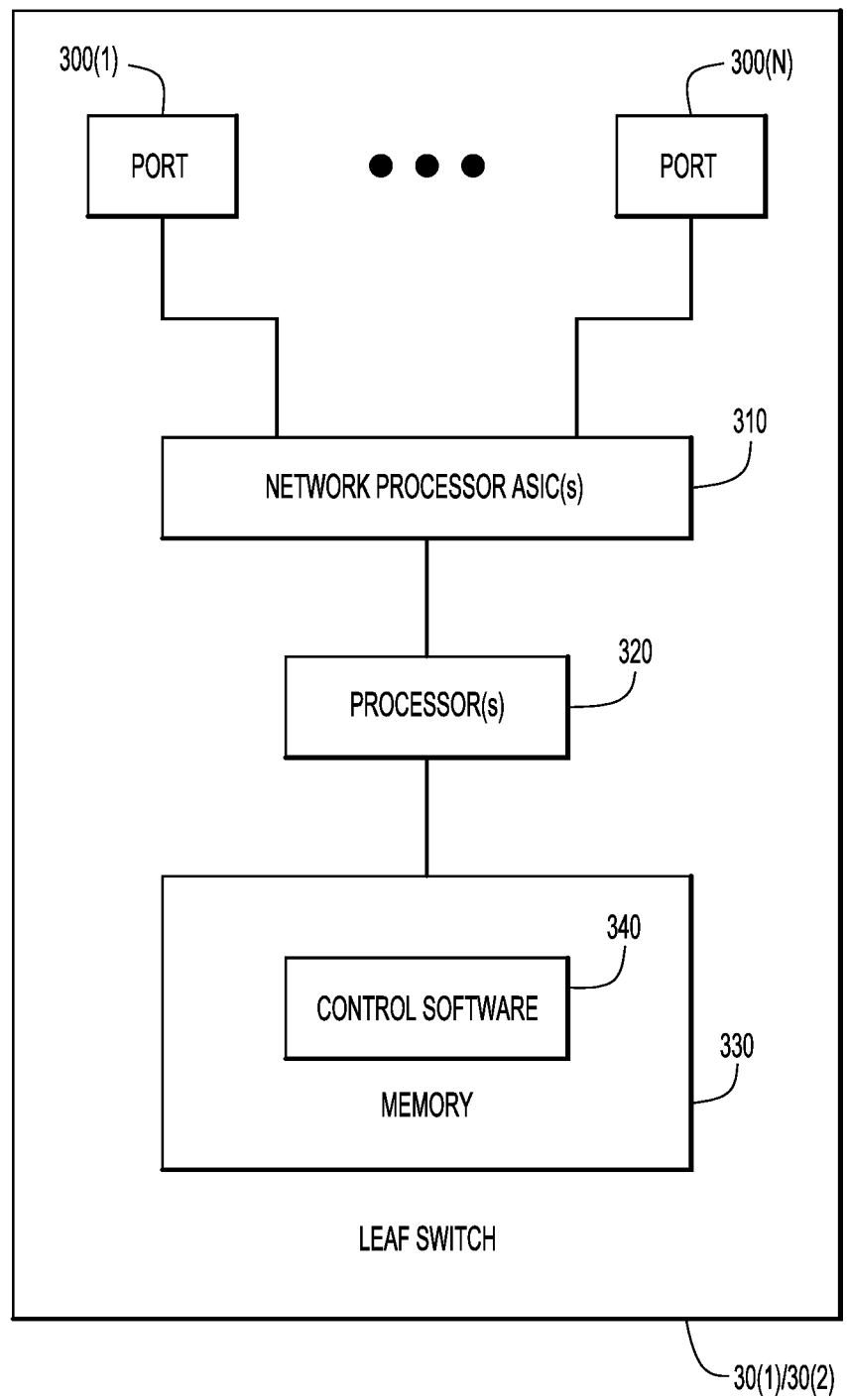
FIG. 7 is a high-level block diagram of a switch, according to an example embodiment.

FIG. 7 illustrates an example of a block diagram of a leaf switch, e.g., switch 30(1) or 30(2), configured to perform the methods described herein. A leaf switch includes a plurality of network ports 300(1)-300(N), one or more network processor application specific integrated circuits (ASICs) 310, one or more processors (e.g., microprocessors or microcontrollers) 320, a memory 330 and control software 340 stored in the memory.

The memory 330 may include read only memory (ROM), random access memory (RAM), magnetic disk storage media devices, optical storage media devices, flash memory devices, electrical, optical, or other physical/tangible memory storage devices. Thus, in general, the memory 330 may comprise one or more tangible (non-transitory) computer readable storage media (e.g., a memory device) encoded with software comprising computer executable instructions and when the software is executed (by the processor 320) it is operable to perform the operations described herein. Alternatively, the network processor ASICs 310 may be configured to perform the operations described herein, or the operations may be implemented by a combination of the control software 340 and the network processor ASIC(s) 310.

To summarize, in one form, a method is provided in which, at a first switch in a data center network, the first switch being configured to function as a virtual tunneling endpoint with respect to an overlay virtual network and being a multi-chassis link aggregation peer to a second switch in the data center network that is also configured to function as a virtual tunneling endpoint with respect to the overlay virtual network, the following operations are performed: sending a gateway protocol advertisement message to a particular switch in the data center network that is configured to distribute advertisement messages to all switches in the data center network, the gateway protocol advertisement message including a physical Internet Protocol address as a next hop for a prefix route of the first switch and a virtual Internet Protocol address for a host Internet Protocol address and media access control route advertisement, which virtual Internet Protocol address is shared by the first switch and the second switch; receiving from the particular switch a gateway protocol update message; determining from the gateway protocol update message that the second switch has the prefix route and indicating the prefix route is also reachable locally from the second switch; in response to determining that the second switch has the prefix route, changing the physical Internet Protocol address to the virtual Internet Protocol address for purposes of advertising a next hop address for the prefix route; and sending to the particular switch a gateway protocol update message containing the virtual Internet Protocol address as the next hop address for the prefix route.

In another form, an apparatus is provided comprising: a plurality of ports configured to send and receive communications over a network on behalf a first switch in a data center network, the first switch being configured to function as a virtual tunneling endpoint with respect to an overlay virtual network and being a multi-chassis link aggregation peer to a second switch in the data center network that is also configured to function as a virtual tunneling endpoint with respect to the overlay virtual network; and a processor coupled to the plurality of ports, wherein the processor is configured to: generate a gateway protocol advertisement message to be sent to a particular switch in the data center network that is configured to distribute advertisement messages to all switches in the data center network, the gateway protocol advertisement message including a physical Internet Protocol address as a next hop for a prefix route of the first switch and a virtual Internet Protocol address for a host Internet Protocol address and media access control route advertisement, which virtual Internet Protocol address is shared by the first switch and the second switch; receive from the particular switch a gateway protocol update message; determine from the gateway protocol update message that the second switch has the prefix route and indicating the prefix route is also reachable locally from the second switch; in response to determining that the second switch has the prefix route, changing the physical Internet Protocol address to the virtual Internet Protocol address for purposes of advertising a next hop address for the prefix route; and generate a gateway protocol update message to be sent to the particular switch, the gateway protocol message containing the virtual Internet Protocol address as the next hop address for the prefix route.

In still another form, one or more non-transitory computer readable storage media encoded with software comprising computer executable instructions and when the software is executed by a processor, the software is operable to perform operations comprising: at a first switch in a data center network, the first switch being configured to function as a virtual tunneling endpoint with respect to an overlay virtual network and being a multi-chassis link aggregation peer to a second switch in the data center network that is also configured to function as a virtual tunneling endpoint with respect to the overlay virtual network: sending a gateway protocol advertisement message to a particular switch in the data center network that is configured to distribute advertisement messages to all switches in the data center network, the gateway protocol advertisement message including a physical Internet Protocol address as a next hop for a prefix route of the first switch and a virtual Internet Protocol address for a host Internet Protocol address and media access control route advertisement, which virtual Internet Protocol address is shared by the first switch and the second switch; receiving from the particular switch a gateway protocol update message; determining from the gateway protocol update message that the second switch has the prefix route and indicating the prefix route is also reachable locally from the second switch; in response to determining that the second switch has the prefix route, changing the physical Internet Protocol address to the virtual Internet Protocol address for purposes of advertising a next hop address for the prefix route; and sending to the particular switch a gateway protocol update message containing the virtual Internet Protocol address as the next hop address for the prefix route.

In still another form, a system is provided in which a first switch and a second switch are configured as multi-chassis link aggregation peers to each other in a data center network, and each of the first and second switches is configured to function as a virtual tunneling endpoint with respect to an overlay virtual network. Each of the first switch and second switch is configured to perform similar operations, including: sending a gateway protocol advertisement message to a particular switch in the data center network that is configured to distribute advertisement messages to all switches in the data center network, the gateway protocol advertisement message including a physical Internet Protocol address as a next hop for a prefix route of the first switch (and a physical Internet Protocol address as a next hop for a prefix route of the second switch) and a virtual Internet Protocol address for a host Internet Protocol address and media access control route advertisement, which virtual Internet Protocol address is shared by the first switch and the second switch; receiving from the particular switch a gateway protocol update message; determining from the gateway protocol update message that the second switch (and first switch) has the prefix route and indicating the prefix route is also locally reachable from the second switch (and first switch); in response to determining that the second switch (and first switch) has the prefix route, changing the physical Internet Protocol address to the virtual Internet Protocol address for purposes of advertising a next hop address for the prefix route; and sending to the particular switch a gateway protocol update message containing the virtual Internet Protocol address as the next hop address for the prefix route.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a first switch in a data center network, the first switch being configured to function as a first virtual tunneling endpoint with respect to an overlay virtual network and being a multi-chassis link aggregation peer to a second switch in the data center network, wherein the second switch is configured to function as a second virtual tunneling endpoint with respect to the overlay virtual network:
   sending a gateway protocol advertisement message to a particular switch in the data center network, wherein the particular switch is configured to distribute advertisement messages to all switches in the data center network, the gateway protocol advertisement message including: (1) a physical Internet Protocol address as a next hop for a prefix route of the first switch and (2) a virtual Internet Protocol address for a host Internet Protocol address and media access control route advertisement, which virtual Internet Protocol address is shared by the first switch and the second switch;
   receiving from the particular switch a first gateway protocol update message;
   determining from the first gateway protocol update message that the second switch has the prefix route and that the prefix route is also reachable locally from the second switch;
   in response to determining that the second switch has the prefix route, changing the physical Internet Protocol address to the virtual Internet Protocol address for purposes of advertising a next hop address for the prefix route; and
   sending to the particular switch a second gateway protocol update message containing the virtual Internet Protocol address as the next hop address for the prefix route.

2. The method of claim 1, further comprising, generating a virtual media access control address to be used as a media access control address for the first switch and the second switch and associated with the virtual Internet Protocol address, and wherein the second gateway protocol update message sent to the particular switch by the first switch includes the virtual media access control address when the virtual Internet Protocol address is used as the next hop address.

3. The method of claim 2, wherein the virtual media access control address comprises a predetermined number of bytes set to a value of the virtual Internet Protocol address and a predetermined bit set to indicate that the virtual media access control address is locally administered.

4. The method of claim 3, wherein the predetermined number of bytes are the last 4 bytes of the virtual media access control address and the predetermined bit is the second least-significant bit of the most significant byte of the virtual media access control address.

5. The method of claim 1, further comprising, at the first switch:
receiving a gateway protocol withdraw message indicating that the second switch no longer has reachability to the prefix route; and
changing the next hop address for the prefix route from the virtual Internet Protocol address to the physical Internet Protocol address of the first switch.

6. The method of claim 1, wherein the gateway protocol is Border Gateway Protocol.

7. The method of claim 6, wherein the particular switch is configured to serve as a Border Gateway Protocol Route Reflector.

8. The method of claim 1, wherein the first switch and the second switch are virtual Port Channel peers.

9. An apparatus comprising:
a plurality of ports configured to send and receive communications over a network on behalf of the apparatus in a data center network, the apparatus being configured to function as a first virtual tunneling endpoint with respect to an overlay virtual network and being a multi-chassis link aggregation peer to a switch in the data center network, wherein the switch is configured to function as a second virtual tunneling endpoint with respect to the overlay virtual network; and
a processor coupled to the plurality of ports, wherein the processor is configured to:
generate a gateway protocol advertisement message to be sent to a particular switch in the data center network, wherein the particular switch is configured to distribute advertisement messages to all switches in the data center network, the gateway protocol advertisement message including: (1) a physical Internet Protocol address as a next hop for a prefix route of the apparatus and (2) a virtual Internet Protocol address for a host Internet Protocol address and media access control route advertisement, which virtual Internet Protocol address is shared by the apparatus and the switch;
receive from the particular switch a first gateway protocol update message;
determine from the first gateway protocol update message that the switch has the prefix route and that the prefix route is also reachable locally from the switch;
in response to determining that the switch has the prefix route, change the physical Internet Protocol address to the virtual Internet Protocol address for purposes of advertising a next hop address for the prefix route; and
generate a second gateway protocol update message to be sent to the particular switch, the second gateway protocol message containing the virtual Internet Protocol address as the next hop address for the prefix route.

10. The apparatus of claim 9, wherein the processor is further configured to generate a virtual media access control address to be used as a media access control address for the apparatus and the switch and associated with the virtual Internet Protocol address, and wherein the second gateway protocol update message sent to the particular switch by the apparatus includes the virtual media access control address when the virtual Internet Protocol address is used as the next hop address.

11. The apparatus of claim 10, wherein the virtual media access control address comprises a predetermined number of bytes set to a value of the virtual Internet Protocol address and a predetermined bit set to indicate that the virtual media access control address is locally administered.

12. The apparatus of claim 11, wherein the predetermined number of bytes are the last 4 bytes of the virtual media access control address and the predetermined bit is the second least-significant bit of the most significant byte of the virtual media access control address.

13. The apparatus of claim 9, wherein the processor is further configured to:
receive a gateway protocol withdraw message indicating that the switch no longer has reachability to the prefix route; and
change the next hop address for the prefix route from the virtual Internet Protocol address to the physical Internet Protocol address of the apparatus.

14. The apparatus of claim 9, wherein the gateway protocol is Border Gateway Protocol.

15. One or more non-transitory computer readable storage media encoded with software comprising computer executable instructions and when the software is executed by a processor, the software is operable to perform operations comprising:
at a first switch in a data center network, the first switch being configured to function as a first virtual tunneling endpoint with respect to an overlay virtual network and being a multi-chassis link aggregation peer to a second switch in the data center network, wherein the second switch is configured to function as a second virtual tunneling endpoint with respect to the overlay virtual network:
sending a gateway protocol advertisement message to a particular switch in the data center network, wherein the particular switch is configured to distribute advertisement messages to all switches in the data center network, the gateway protocol advertisement message including: (1) a physical Internet Protocol address as a next hop for a prefix route of the first switch and (2) a virtual Internet Protocol address for a host Internet Protocol address and media access control route advertisement, which virtual Internet Protocol address is shared by the first switch and the second switch;
receiving from the particular switch a first gateway protocol update message;
determining from the first gateway protocol update message that the second switch has the prefix route and that the prefix route is also reachable locally from the second switch;
in response to determining that the second switch has the prefix route, changing the physical Internet Protocol address to the virtual Internet Protocol address for purposes of advertising a next hop address for the prefix route; and
sending to the particular switch a second gateway protocol update message containing the virtual Internet Protocol address as the next hop address for the prefix route.

16. The one or more non-transitory computer readable storage media of claim 15, further comprising instructions operable for generating a virtual media access control address to be used as a media access control address for the first switch and the second switch and associated with the virtual Internet Protocol address, and wherein the second gateway protocol update message sent to the particular switch by the first switch includes the virtual media access control address when the virtual Internet Protocol address is used as the next hop address.

17. The one or more non-transitory computer readable storage media of claim 16, wherein the virtual media access control address comprises a predetermined number of bytes set to a value of the virtual Internet Protocol address and a predetermined bit set to indicate that the virtual media access control address is locally administered.

18. The one or more non-transitory computer readable storage media of claim 17, wherein the predetermined number of bytes are the last 4 bytes of the virtual media access control address and the predetermined bit is the second least-significant bit of the most significant byte of the virtual media access control address.

19. The one or more non-transitory computer readable storage media of claim 15, further comprising instructions operable for:
    receiving a gateway protocol withdraw message indicating that the second switch no longer has reachability to the prefix route; and
    changing the next hop address for the prefix route from the virtual Internet Protocol address to the physical Internet Protocol address of the first switch.

20. The one or more non-transitory computer readable storage media of claim 15, wherein the gateway protocol is Border Gateway Protocol.

* * * * *